United States Patent [19]
Iwai

[11] Patent Number: 5,815,795
[45] Date of Patent: Sep. 29, 1998

[54] OSCILLATION DETECTING SYSTEM FOR WIRELESS REPEATER

[75] Inventor: Tohru Iwai, Osaka, Japan

[73] Assignee: Sumitomo Electric Industries, Ltd., Osaka, Japan

[21] Appl. No.: 686,034

[22] Filed: Jul. 25, 1996

[30]     Foreign Application Priority Data

Aug. 25, 1995  [JP]  Japan .................................. 7-217141
Dec. 27, 1995  [JP]  Japan .................................. 7-341602

[51] Int. Cl.[6] ............................................ H04B 1/60
[52] U.S. Cl. ........................... 455/9; 455/7; 455/10; 455/11.1; 455/13.4; 455/18; 370/318
[58] Field of Search ............... 455/7, 9, 10, 11.1, 455/13.1, 13.4, 12.1, 18; 370/226, 246, 274, 315, 318

[56]          References Cited

U.S. PATENT DOCUMENTS

| | | | |
|---|---|---|---|
| 4,083,004 | 4/1978 | Cohn | 455/18 |
| 4,713,809 | 12/1987 | Mizota | 455/18 |
| 5,060,292 | 10/1991 | Ayukawa et al. | 455/115 |
| 5,200,955 | 4/1993 | McFarlane et al. | 455/18 |

*Primary Examiner*—Donnie L. Crosland
*Attorney, Agent, or Firm*—Lane, Aitken & McCann

[57]          ABSTRACT

An oscillation detecting apparatus for detecting an oscillation of a wireless repeater intervening between a base station and a mobile station brought in communication with each other through a TDMA system. The wireless repeater produces an input signal based on a radio wave transmitted from one of the base station and the mobile stations, and amplifies the input signal to produce an output signal. The output signal is transmitted from the wireless repeater to the other of the base station and the mobile station. The oscillation detecting apparatus comprises producing apparatus for producing a power level signal varied in proportion with an amplitude of the output signal. The power level signal is formed by, for example, an envelope of the output signal. The oscillation detecting apparatus further comprises first detecting apparatus for detecting a direct current component included in the power level signal, and second detecting apparatus for detecting an alternating current component included in the power level signal. The oscillation detecting apparatus further comprises first judging apparatus for judging whether the direct current component of the power level signal has reached a predetermined upper-limiting level, and second judging apparatus for judging whether the alternating current component of the power level signal is smaller than a predetermined criterion level. The oscillation detecting apparatus includes deciding apparatus for deciding that the wireless repeater is oscillating when both judgments are affirmative, thereby making it possible to enhance the accuracy of the oscillation detection.

18 Claims, 13 Drawing Sheets

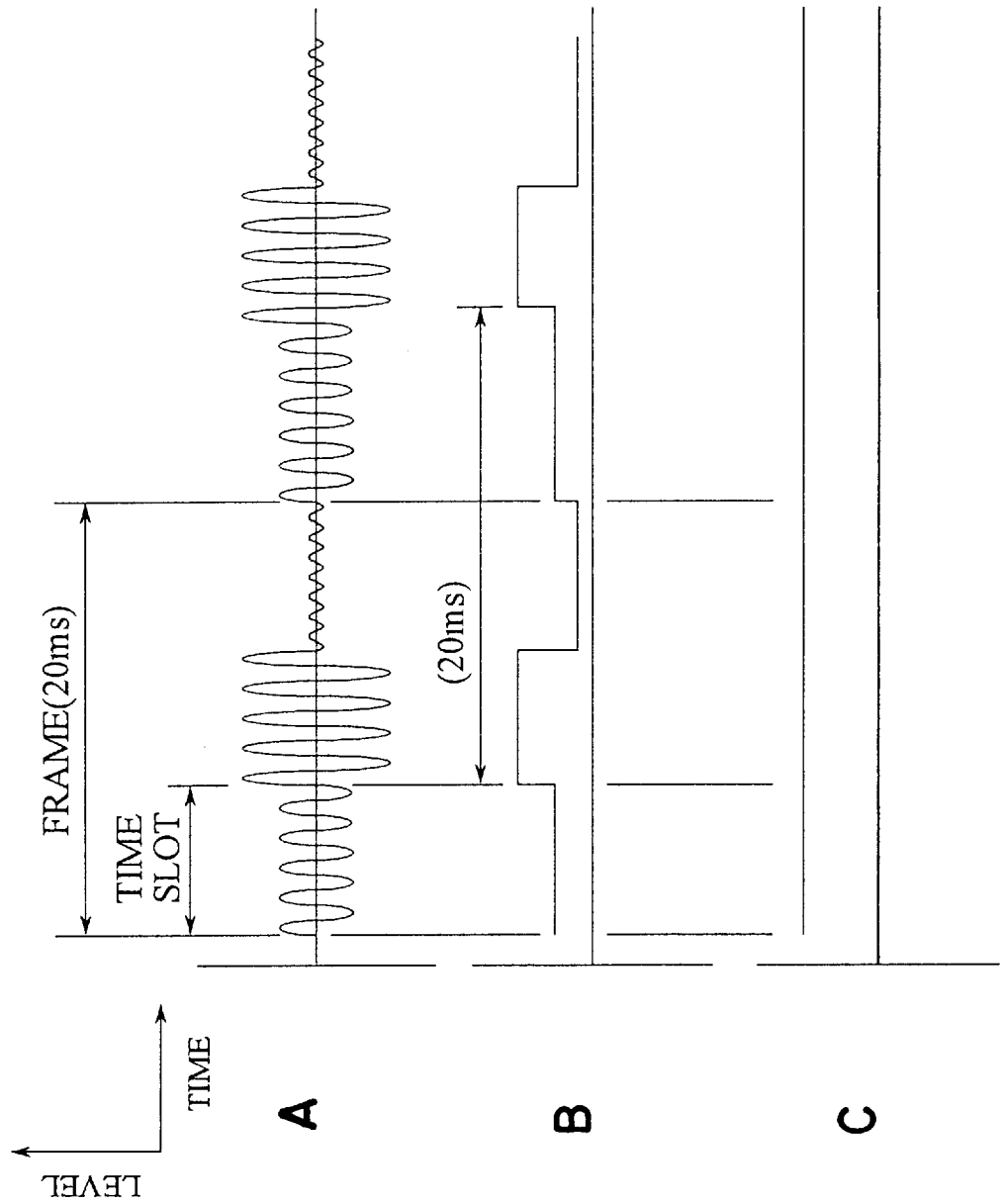

FIG. 7

| ALTERNATING CURRENT OUTPUT LEVEL \ DIRECT CURRENT OUTPUT LEVEL | DC OUTPUT LEVEL IS LOWER THAN UPPER-LIMITTING LEVEL | DC OUTPUT LEVEL HAS REACHED UPPER-LIMITTING LEVEL |
|---|---|---|
| AC OUTPUT LEVEL EXCEEDS CRITERION LEVEL | NO OSCILLATION | NO OSCILLATION (MOBILE STATION IS IN THE VICINITY OF WIRELESS REPEATER) |
| AC OUTPUT LEVEL IS LOWER THAN CRITERION LEVEL | NO OSCILLATION | OSCILLATION |

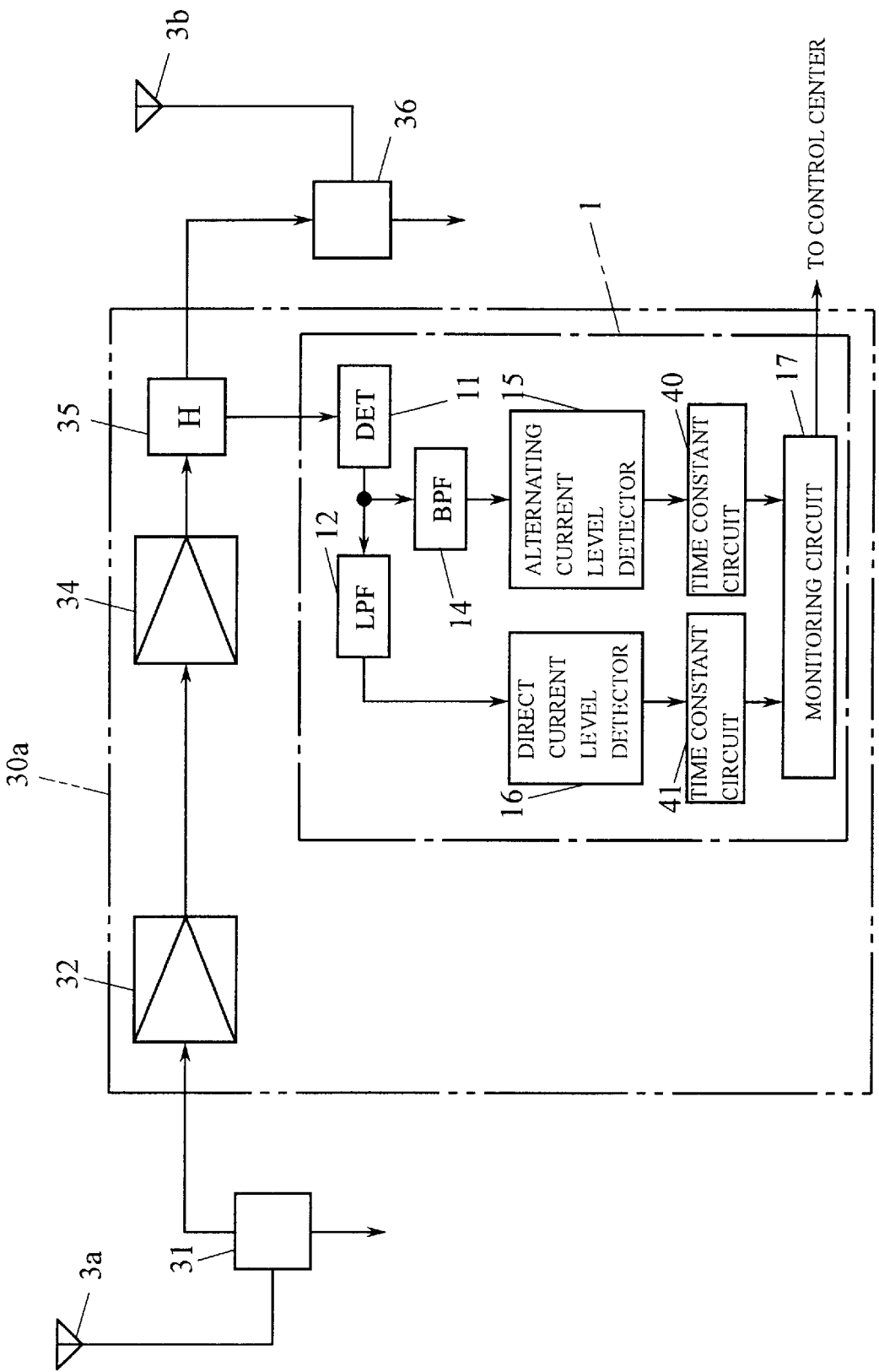

OSCILLATION DETECTING SYSTEM FOR WIRELESS REPEATER

BACKGROUND OF THE INVENTION

1. Field of the Invention

The present invention relates to an oscillation detecting system for a wireless repeater and, more specifically, to an oscillation detecting apparatus for detecting that a wireless repeater is oscillating, and a wireless repeater having an ability to detect its own oscillation. The wireless repeater intervenes between a base station and a mobile station brought in communication with each other through a time division multiple access (abbreviated in general to "TDMA") system.

2. Description of the Related Art

In recent years, mobile stations such as vehicle mobile telephones and cellular telephones become extremely smaller, cheaper, and more reliable and, for this reason, a wide variety of mobile wireless communication methods and services have been enthusiastically adopted by people throughout the world. The mobile wireless communication is generally formed between the mobile stations or between the mobile station and a network such as a public telephone network by way of a fixed base station which has a mobile wireless communication service area. If the mobile wireless communication service area includes silent zones such as hilly districts, tunnels, parking garages, underground parking spaces, underground passages, underground shopping arcades and blind spots due to buildings, the base station has a difficulty in covering the whole of the wireless communication service area. If the users are in such silent zones, it is quite natural that the users should require reliable wireless communication. The requirements of the users are fulfilled by wireless repeaters which are located within or in the vicinity of the silent zones. If the mobile station is in the silent zone, the wireless repeater intervenes the mobile station and the base station to make it possible to bring them in communication with each other. When the wireless repeater receives a radio wave from one of the mobile station and the base station, an input signal is produced by the wireless repeater on the basis of the received radio wave. The input signal is amplified by the wireless repeater to form an output signal on the basis of which the radio wave is reproduced and transmitted to the other of the mobile station and the base station. In order to fill the role of the aforementioned intervention, the wireless repeater comprises a mobile station side antenna for receiving the radio wave from and transmitting the radio wave to the mobile station, a base station side antenna for receiving and transmitting the radio wave from and to the base station, an up-communication circuit including an amplifier for amplifying the radio wave transmitted from the mobile station toward the base station, and a down-communication circuit including an amplifier for amplifying the radio wave transmitted from the base station toward the mobile station. The radio wave handled by the up-communication has a different frequency than that by the down-communication has. If the mobile station approaches the wireless repeater, the up-communication circuit is liable to receive a radio wave of extremely large level. In this instance, the output signal of the up-communication circuit becomes extremely large in level under the condition that a gain of the up-communication circuit is held at a constant level. The extremely large output level of the up-communication circuit results in the fact that the up-communication circuit operates in a saturation region of the amplifier and accordingly that the output signal of the up-communication circuit is caused to have a skew wave form. On purpose to resolve the problem, an automatic gain control circuit (hereinlater referred to as "AGC circuit" for brevity) is used to restrict the output signal of the up-communication circuit to a predetermined upper-limiting level. The AGC circuit is disclosed for example in European Patent publication Nos. 0 114 066 A2 and 0 621 685 A1.

In the meantime, it is possible that there is a coupling between the base station side antenna and the mobile station side antenna. If the intensity of the coupling exceeds the gain of the amplifier of the wireless repeater, the wireless repeater is operated to produce an oscillation and accordingly has a difficulty in operating normally. The coupling of the antennas is weakened by contriving the arrangement of the base station side and mobile station side antennas, thereby making it possible to dodge the trouble due to the coupling of the base station side and mobile station side antennas to some extent. If, however, the variation of circumstances, for example, the growth of trees in the vicinity of the wireless repeater cause the reflection and scattering state of the radio wave to vary, the coupling of the base station side and mobile station side antennas is varied and accordingly is liable to cause the wireless repeater to oscillate. When the wireless repeater oscillates, the output signal of the wireless repeater is restricted to the predetermined upper-limiting level by the AGC circuit. At the same time, the AGC circuit is operated to produce an output signal of direct current. The oscillation of the wireless repeater differs from a mere increase of the level of the input signal of the wireless repeater in that the oscillation of the wireless repeater cannot be disregarded. The oscillation, therefore, should be distinguished from the provisional increase of the input signal level and detected by a company, an organization, a corporation or the like providing the mobile wireless communication services. Since there is, in general, no administrator posted to the wireless repeater, the wireless repeater is required to automatically detect its own oscillation. The wireless repeater, however, can scarcely distinguish its own oscillation from the provisional increase of the input signal level on the basis of the direct current output of the AGC circuit and, accordingly, cannot correctly detect its own oscillation. The reason for this is that the AGC circuit produce the direct current output when the wireless repeater is operated to oscillate as well as when the input signal level is extremely increased.

SUMMARY OF THE INVENTION

It is an object of the present invention to provide an oscillation detecting apparatus capable of automatically detecting with accuracy that a wireless repeater is oscillating.

It is another object of the present invention to provide a wireless repeater capable of automatically detecting its own oscillation with accuracy.

In accordance with one aspect of the present invention, there is provided an oscillation detecting apparatus for detecting an oscillation of a wireless repeater intervening between a base station and a mobile station brought in communication with each other through a time division multiple access system. The wireless repeater is operated to produce an input signal based on a radio wave transmitted from one of the base station and the mobile station, and amplify the input signal to produce an output signal. The wireless repeater is further operated to transmit the output signal in the form of a radio wave to the other of the base station and the mobile station. The oscillation detecting apparatus comprises producing means for producing a power level signal varied in proportion with an amplitude of the output signal, first detecting means for detecting a direct current component included in the power level signal, and second detecting means for detecting an alternating current component included in the power level signal. The oscillation detecting apparatus further comprises first judging means for judging whether the direct current component of the power level signal has reached a predetermined upper-limiting level or not, and second judging means for judging whether the alternating current component of the power level signal is smaller than a predetermined criterion level or not. The oscillation detecting apparatus further comprises deciding means for deciding that the wireless repeater is oscillating when the first judging means judges that the direct current component of the power level signal has reached the predetermined upper-limiting level, and when the second judging means judges that the alternating current component of the power level signal is smaller than the predetermined criterion level.

In accordance with another aspect of the present invention, there is provided a wireless repeater intervening between a base station and a mobile station brought in communication with each other through a time division multiple access system. The wireless repeater comprises receiving means for receiving a radio wave transmitted from one of the base station and the mobile station and producing an input signal based on the received radio wave, amplifying means for amplifying the input signal to produce an output signal, and transmitting means for reproducing a radio wave on the basis of the output signal and transmitting the reproduced radio wave to the other of the base station and the mobile station. The wireless repeater further comprises producing means for producing a power level signal varied in proportion with an amplitude of the output signal, first detecting means for detecting a direct current component included in the power level signal, and second detecting means for detecting an alternating current component included in the power level signal. The wireless repeater further comprises first judging means for judging whether the direct current component of the power level signal has reached a predetermined upper-limiting level or not, and second judging means for judging whether the alternating current component of the power level signal is smaller than a predetermined criterion level or not. The wireless repeater further comprises deciding means for deciding that the wireless repeater is oscillating when the first judging means judges that the direct current component of the power level signal has reached the predetermined upper-limiting level, and when the second judging means judges that the alternating current component of the power level signal is smaller than the predetermined criterion level.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 6 illustrates a wave form chart A showing an output signal produced by a main signal amplifier shown in FIG. 4, a wave form chart B showing an envelope of the output signal detected by an envelope detector shown in FIG. 4 when there is no oscillation in the wireless repeater, and a wave form chart C showing an envelope of the output signal detected by the envelope detector shown in FIG. 4 when the wireless repeater is oscillating.

FIG. 7 is a descriptive diagram indicating decisions by a monitoring circuit shown in FIG. 4 in each combination of judgments by direct current and alternating current level detectors shown in FIG. 4;

FIG. 12 is a schematic block diagram showing an up-communication repeater unit of a fifth embodiment of the wireless repeater according to the present invention;

DESCRIPTION OF THE PREFERRED EMBODIMENTS

Referring to FIGS. 1 to 7 of the drawings, a first embodiment of the wireless repeater according to the present invention will be described hereinlater. The wireless repeater is provided with an oscillation detecting apparatus according to the present invention.

Figure 1:
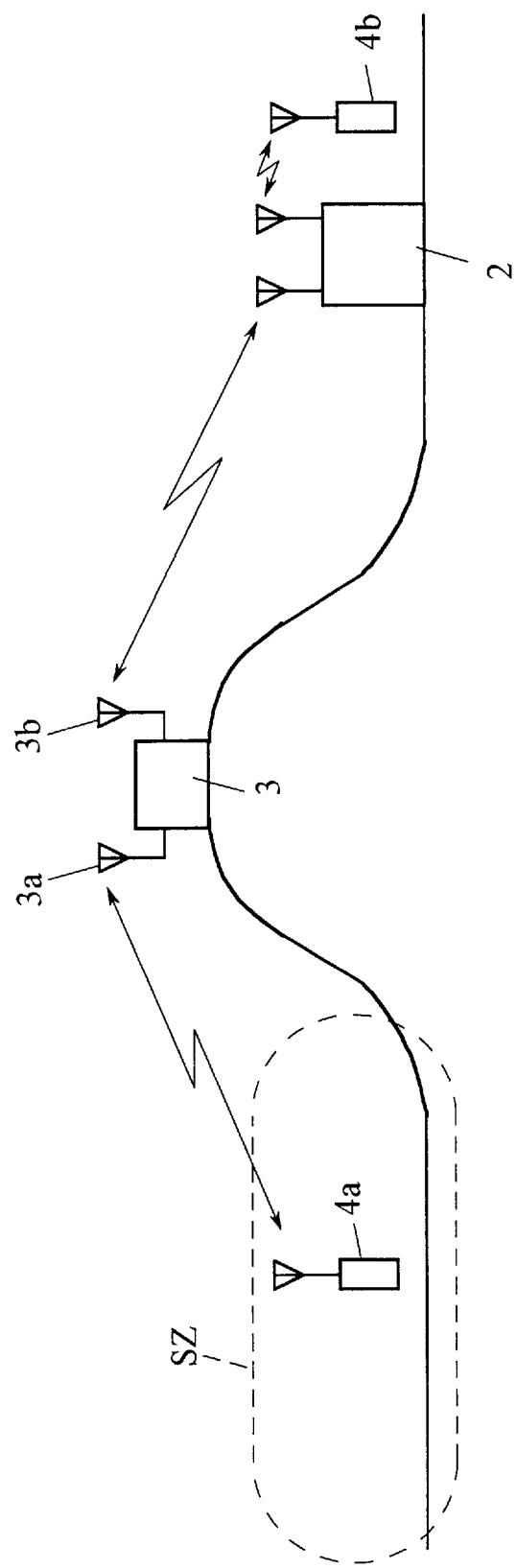
FIG. 1 is a schematic block diagram showing a mobile wireless communication system including a first embodiment of a wireless repeater according to the present invention.

The wireless repeater partly forms a mobile wireless communication system shown in FIG. 1. The mobile wireless communication system comprises a base station 2, a first mobile station 4a and a second mobile station 4b in addition to the wireless repeater denoted by reference numeral 3. The base station 2 has a silent zone SZ such as a hilly district, a tunnel, a parking garage, an underground parking space, an underground passage, an underground shopping arcade or a blind spot due to buildings. The wireless repeater 3 is located so as to cover the silent zone SZ. When the first mobile station 4a is within the silent zone SZ as shown in FIG. 1, the first mobile station 4a cannot communicate directly with the base station 2. It therefore follows that the wireless repeater 3 intervenes between the base station 2 and the first mobile station 4a to enable the mobile station 4a in the silent zone SZ to communicate with the base station 2.

The wireless repeater 3 is shown in FIG. 1 as comprising a mobile station side antenna 3a for transmitting and receiving a radio wave to and from the first mobile station 4a in the silent zone SZ, and a base station side antenna 3b for transmitting and receiving a radio wave to and from the base station 2. The first and second mobile stations 4a and 4b may be mobile telephones for vehicles, cellular telephones, hand-held walkie talkies, hand-held radio terminals, cordless telephones, paging receivers, radio ID tags and wireless IC cards.

When the second mobile station 4b in the vicinity of the base station 2 selects the second mobile station 4a and transmits a radio wave including transmittance information toward the selected second mobile station 4a, the radio wave from the second mobile station 4b is received and transmitted by the base station 2. The radio wave transmitted from the base station 2 is received by the base station side antenna 3b of the wireless repeater 3 and amplified by the wireless repeater 3 to the extent of a required level. The radio wave amplified by the wireless repeater 3 is transmitted from the mobile station side antenna 3a toward the silent zone SZ. When the radio wave transmitted from the wireless repeater 3 is received by the first mobile station 4a in the silent zone SZ, the first mobile station 4a is operated to transmit a radio wave including reply information made in response to the transmittance information. The radio wave transmitted from the first mobile station 4a is received by the mobile station side antenna 3a of the wireless repeater 3 and amplified by the wireless repeater 3 to the extent of a required level. The radio wave amplified by the wireless repeater 3 is transmitted from the base station side antenna 3b. Since the base station side antenna 3b of the wireless repeater 3 is designed to have a directivity fit for the base station 2, the radio wave from the base station side antenna 3b is received by the base station 2. The received radio wave is transmitted from the base station 2 toward the second mobile station 4b in the vicinity of the base station 2. When the second mobile station 4b receives the radio wave including the reply information from the base station 2, a mobile wireless communication between the first and second mobile stations 4a and 4b is accomplished. As will be understood from the foregoing description, the wireless repeater 3 is operated to amplify the radio wave from the base station 2 to the extent of the required level and transmit the amplified radio wave to the first mobile station 4a in the silent zone SZ. The wireless repeater 3 is also operated to amplify the radio wave from the first mobile station 4a in the silent zone SZ to the extent of the required level and transmit the amplified radio wave to the base station 2.

Figure 2:
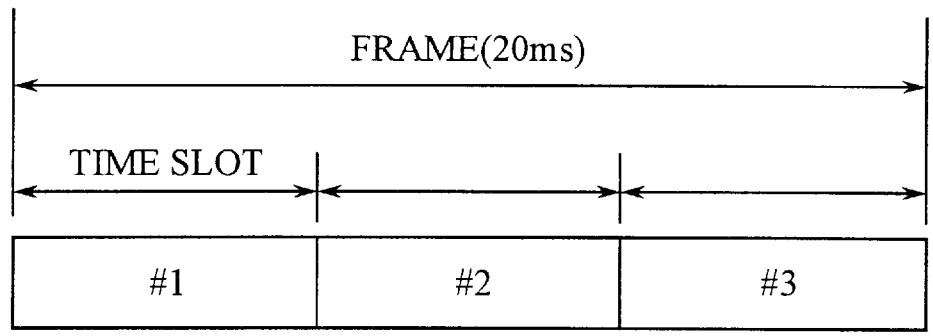
FIG. 2 is a schematic diagram showing a frame used in TDMA system.

The mobile wireless communication system described hereinbefore and shown in FIG. 1 adopts, as a multiple access system, a time division multiple access system (hereinafter referred to as "TDMA system" for brevity). In general, the multiple access system is used to allow a lot of mobile users to share simultaneously a finite amount of radio spectrum. The TDMA system divides the radio spectrum into a plurality of time slots each allocated to and occupied by each mobile station user. The time slots as a whole form a frame and each reoccurring every frame. FIG. 2 shows the frame having a duration of 20 ms and comprising three time slots which are representative of channels #1, #2 and #3, respectively, and allocated to three different mobile stations including the first and second mobile stations 4a and 4b. The radio wave is transmitted as burst signals from each mobile station. Specifically, the radio wave including the transmittance information or the reply information is repeatedly transmitted from each mobile station at regular intervals each corresponding to a multiple of the duration of the frame or a multiple of 20 ms.

Figure 3:
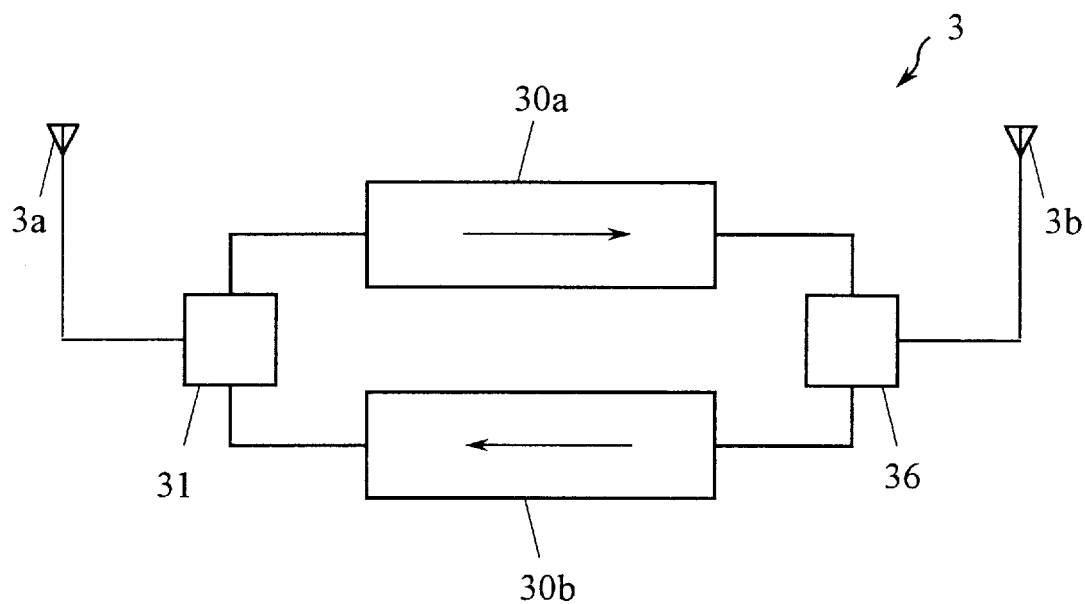
FIG. 3 is a schematic block diagram showing the wireless repeater shown in FIG. 1.

The wireless repeater is shown in FIG. 3 as further comprising an up-communication repeater unit 30a for up-communication in which information is transmitted from the first mobile station 4a in the silent zone SZ to the base station 2, a down-communication repeater unit 30b for down-communication in which information is transmitted from the base station 2 to the first mobile station 4a in the silent zone SZ. The radio wave received by the mobile station side antenna 3a is converted to an electric signal corresponding to an input signal of the up-communication repeater unit 30a. The input signal is amplified by the up-communication repeater unit 30a to change to an output signal. The output signal is transmitted from the base station side antenna 3b to the base station 2 in the form of a radio wave. Likewise, the radio wave received by the base station side antenna 3b is converted to an electric signal corresponding to an input signal of the down-communication repeater unit 30b. The input signal is amplified by the down-communication repeater unit 30b to change to an output signal. The output signal is transmitted from the mobile station side antenna 3a to the mobile station 4a in the silent zone SZ in the form of a radio wave.

The wireless repeater 3 further comprises a first duplexer 31 for allowing the input or output signal to be transmitted selectively from the mobile station side antenna 3a to the up-communication repeater unit 30a and from the down-communication repeater unit 30b to the mobile station side antenna 3a, and a second duplexer 36 for allowing the input or output signal to be transmitted selectively from the base station side antenna 3b to the down-communication repeater unit 30b and from the up-communication repeater unit 30a to the base station side antenna 3b. In place of the first and second duplexers 31 and 36, the wireless repeater 3 may comprise a pair of circulators each of which forms a circuit having three terminals each capable of serving as an input terminal and an output terminal to circularly shift a combination of input and output between the three terminals.

Figure 4:
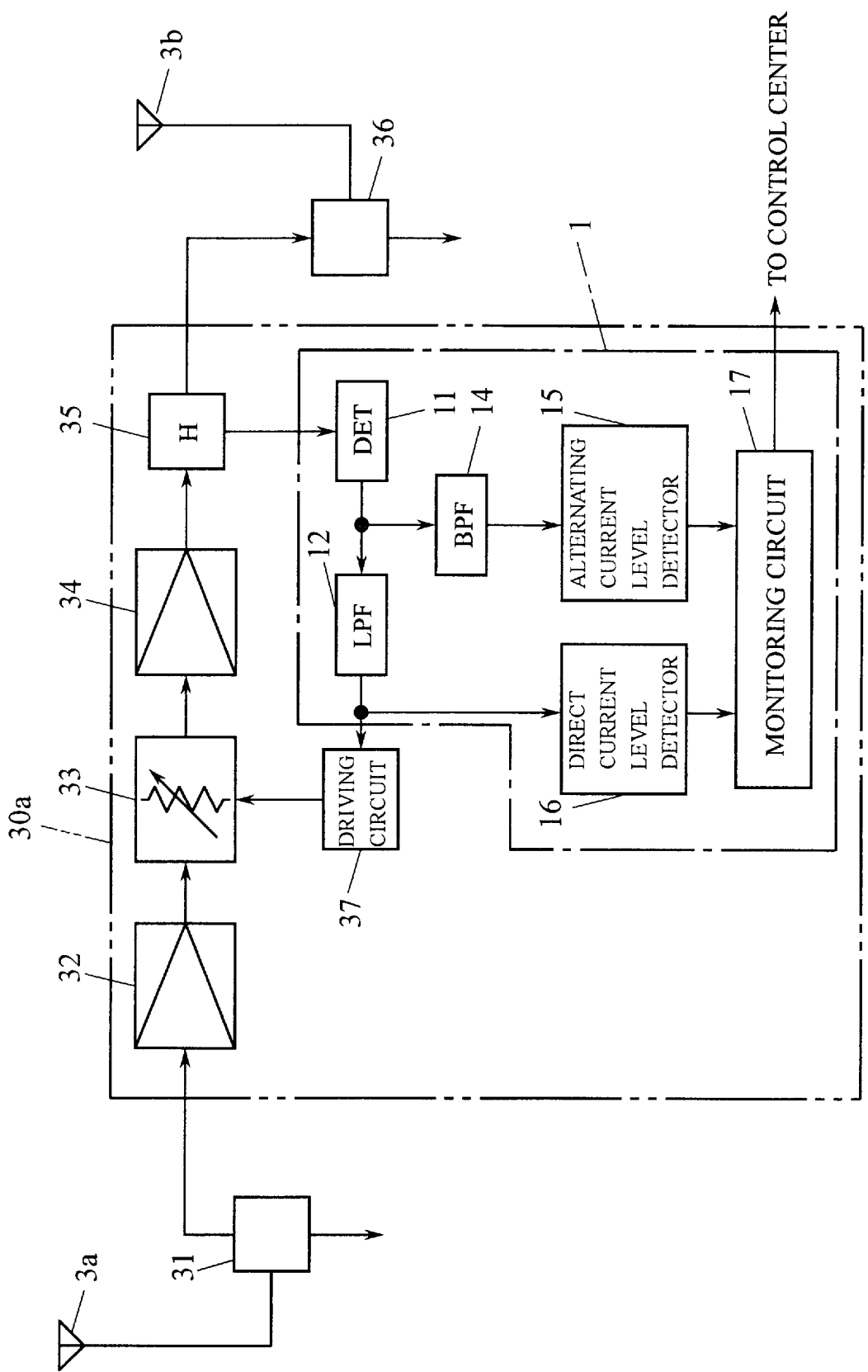
FIG. 4 is a schematic block diagram showing an up-communication repeater unit shown in FIG. 3.

The up-communication repeater unit 30a is shown in FIG. 4 as comprising a pre-amplifier 32, a variable attenuator 33, a main amplifier 34, a divider 35, a driving circuit 37 and an oscillation detecting apparatus 1. The pre-amplifier 32 is designed to amplify the input signal from the first duplexer 31 to the extent of a predetermined level. The variable attenuator 33 is designed to regulate the amplified signal received from the pre-amplifier 32 in accordance with a driving signal received from the driving circuit 37 to restrict the output signal outputted from the main amplifier 34 to a predetermined upper-limiting level. The main amplifier 34 is designed to amplify the regulated signal received from the variable attenuator 33 to produce the output signal. The divider 35 is designed to divide the output signal received from the main amplifier 34 between the second duplexer 36 and the oscillation detecting apparatus 1.

The driving circuit 37 receives low frequency components included in an envelope of the output signal from the oscillation detecting apparatus 1 to produce the driving signal for the variable attenuator 33. The low frequency components of the envelope of the output signal is produced by an envelope detector 11 and a low-pass filter 12 which will become apparent as the description proceeds. It therefore follows that the variable attenuator 33, the divider 35, the envelope detector 11, the low-pass filter 12 and the driving circuit 37 collectively forms an AGC circuit.

The oscillation detecting apparatus 1 is shown in FIG. 4 as comprising a band-pass filter 14 besides the envelope detector 11 and the low pass filer 12. The envelope detector 11 is designed to receive a signal and produce an envelope of the received signal. The envelope detector 11 may be considered to be a device producing a power level signal varied in proportion with an amplitude of the output signal. Specifically, the power level signal is increased when the amplitude of the output signal is increased. Conversely, the power level signal is decreased when the amplitude of the output signal is decreased. The power level signal may be not necessarily direct proportional to the amplitude of the output signal. For example, the power level signal may be formed on the basis of the output signal through square detection techniques. The power level signal corresponds to the envelope of the output signal but, if desired, the power level signal may be a signal showing fluctuation of a physical value that is representative of intensity of the output signal. The physical value may correspond to the average of root-mean-square values of the output signal in each time slot, the average of amplitude of the output signal in each time slot, the average of electric power of the output signal in each time slot or the like.

Figure 5A:
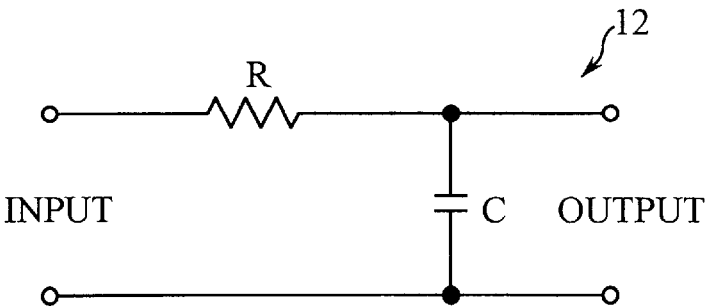
FIG. 5(a) is a wiring diagram showing an example of a low-pass filter shown in FIG. 4.
Figure 5B:
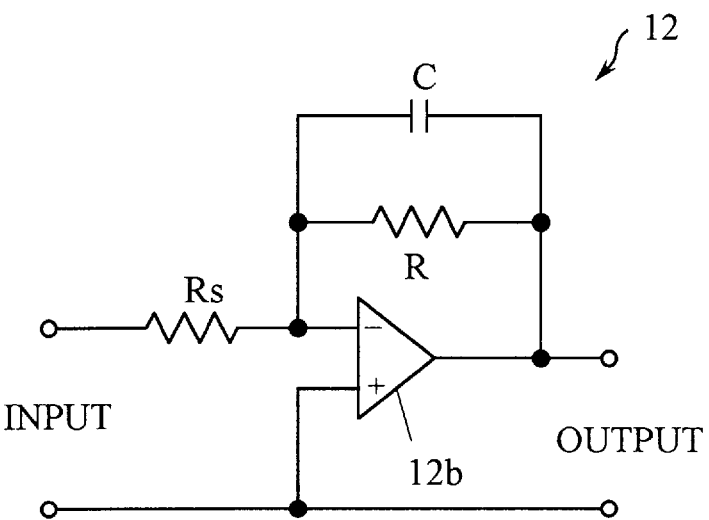
FIG. 5(b) is a wiring diagram showing another example of the low-pass filter shown in FIG. 4.

The low-pass filter 12 is designed to allow only frequency components lower than a cut-off frequency fc to pass therethrough, while the band-pass filter 14 is designed to allow only frequency components within a predetermined frequency band to pass therethrough. More specifically, the envelope detector 11 is operated to receive the output signal fed to the oscillation detecting apparatus 1 and to produce an envelope of the output signal. This means that low frequency components including the following direct current component and the following alternating current component are derived from the output signal fed to the oscillation detecting apparatus 1. The low frequency components included in the envelope of the output signal are supplied to the low-pass filter 12 and the band-pass filter 14. The cut-off frequency fc of the low-pass filter 12 is determined so that the frequency components outputted from the low-pass filter 12 will include and approximate the direct current component of the envelope of the output signal. The low-pass filter 12 is, for example, a circuit shown in FIG. 5(a) or another circuit shown in FIG. 5(b). The former circuit shown in FIG. 5(a) comprises a resistor R and a capacitor C, while the latter circuit shown in FIG. 5(b) comprises a resistor Rs, an amplifier 12b, a resistor R and a capacitor C. When the circuit shown in FIG. 5(a) or FIG. 5(b) is adopted as the low-pass filter 12, the cut-off frequency fc of the low-pass filter 12 is designated by an equation described as follows:

$$fc = 1/2\pi RC \qquad (1)$$

Figure 5C:
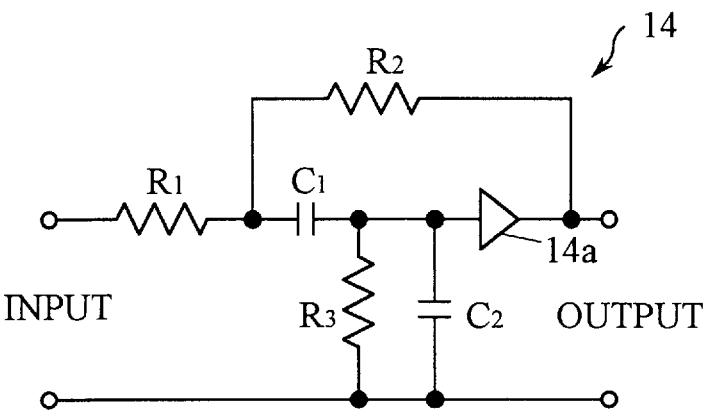
FIG. 5(c) is a wiring diagram showing a band-pass filter shown in FIG. 4.

On the other hand, the predetermined frequency band of the band-pass filter 14 is predetermined so as to have a center frequency f substantially equal to a frequency represented by a reciprocal number of the duration of the frame in TDMA system. This results in the fact that an alternating current component corresponding to the reciprocal number of the duration of the frame in TDMA system is derived from the output signal fed to the oscillation detecting apparatus 1. If the duration of the frame is 20 ms as described above, the center frequency f of the predetermined frequency band is set to 50 Hz. The band-pass filter 14 is, for example, a circuit shown in FIG. 5(c) comprising resistors $R_1$, $R_2$ and $R_3$, capacitors $C_1$ and $C_2$, and an amplifier 14a. When the circuit shown in FIG. 5(c) is adopted as the band-pass filter 14, the center frequency f of the predetermined frequency band is designated by an equation described as follows:

$$f = 1/2\pi \{(1/R_1 + 1/R_2)/R_3 \times C_1 \times C_2\}^{1/2} \qquad (2)$$

It will be apparent from the above description that the envelope detector 11 may be regarded to a device adapted to produce a power level signal varied in proportion with an amplitude of the output signal. It will be also apparent from the above description that the low-pass filter 12 and the band-pass filter 14 respectively may be regarded to be a device adapted to detect the direct current component of the power level signal, and a device adapted to detect the alternating current component of the power level signal corresponding to the reciprocal number of the duration of the frame in TDMA system.

Referring back to FIG. 4, the oscillation detecting apparatus 1 further comprises a direct current level detector 16, an alternating current level detector 15 and a monitoring circuit 17. The direct current component included in the envelope of the output signal is fed to the direct current level detector 16 from the low-pass filter 12. The direct current level detector 16 is designed to detect a level of the direct current component included in the envelope of the output signal. On the other hand, the alternating current component included in the envelope of the output signal is fed to the alternating current level detector 15 from the band-pass filter 14. The alternating current level detector 15 is designed to detect a level of the alternating current component included in the envelope of the output signal. The level of the direct current component included in the envelope of the output signal means a level average of the direct current component included in the output of the envelope detector 11, while the level of the alternating current component included in the envelope of the output signal means a level average of the alternating current component included in the output of the envelope detector 11. In order to simplify the description, the level of the direct current component included in the envelope of the output signal and the level of the alternating current component included in the envelope of the output signal are referred hereinafter as "direct current output level" and "alternating current output level," respectively. The direct current output level and the alternating current output level are supplied to the monitoring circuit 17 from the direct and alternating current level detectors 16 and 15, respectively. The monitoring circuit 17 is designed to decide, on the basis of the direct current output level and the alternating current output level, whether the wireless repeater 3 is oscillating or not. The reason why the oscillation of the wireless repeater is monitored by the monitoring circuit 17 is that the mobile wireless communication service company is required to quickly take measures against the oscillation of the wireless repeater.

More specifically, in the monitoring circuit 17, a judgment is made on whether the direct current output level has reached the predetermined upper-limiting level or not. If the monitoring circuit 17 judges that the direct current output level has reached the predetermined upper-limiting level, the monitoring circuit 17 determines that the first mobile station 4a approaches the wireless repeater 3 or that the wireless repeater 3 is oscillating. The monitoring circuit 17, however, cannot decide, on the basis of only the direct current output level, whether the increase of the direct current output level to the extent of the upper-limiting level results from the approach of the first mobile station 4a to the wireless repeater 3, or from the oscillation of the wireless repeater 3.

In order to distinguish the two causes inviting the increase of the direct current component level, the monitoring circuit 17 is adapted to further judge whether the alternating current output level is smaller than a predetermined criterion level or not. If the monitoring circuit 17 judges that the alternating current output level is smaller than the predetermined criterion level as well as that the current component level has reached the predetermined upper-limiting level, the monitoring circuit 17 decides that the increase of the direct current component level to the extent of the upper-limiting level results from the oscillation of the wireless repeater 3. In other words, when the direct current output level of the output signal has reached the predetermined upper-limiting level, and when the alternating current output level of the output signal is smaller than the predetermined criterion level, the monitoring circuit 17 decides that the wireless repeater 3 is oscillating.

The monitoring circuit 17 is operated to send the decision to a control center (not shown) set by the mobile communication service company. The control center sends the received decision to a communication administration facilities (not shown) to which administrators for the mobile wireless communication are posted. When the administrators know that the wireless repeater 3 is oscillating, the administrators cab quickly take measures against the oscillation of the wireless repeater 3, i.e., they can quickly adjust a gain of the wireless repeater 3 or aspects of the antennas 3a and 3b of the wireless repeater 3 to stop the oscillation of the wireless repeater 3.

The reason why the two causes inviting the increase of the direct current component level to the extent of the upper-limiting level can be distinguished will be described hereinafter with reference to FIG. 6.

As will be apparent from the foregoing description, the frame in the TDMA system is divided into a plurality of time slots allocated to mobile stations including the first and second mobile stations 4a and 4b. In the present embodiment, the duration of the frame is 20 ms. Each mobile station transmits a radio wave in the form of burst signals in TDMA system. Specifically, the radio wave including the transmittance information or the reply information is repeatedly transmitted from each mobile station at regular intervals each corresponding to a multiple of 20 ms. The radio waves transmitted from mobile stations are different in intensity from one another because of the fact that the radio waves are transmitted and received under influences of different fading effects, respectively and because of the fact that the mobile stations are positioned apart from the wireless repeater 3 at different distances, respectively. In view of the facts, it does not occur that the input signal based on the radio waves received by the wireless repeater 3 are held at a constant level during the duration of one frame. The level of the input signal based on the radio waves received by the wireless repeater 3 is varied during the duration of one frame or 20 ms and, accordingly, signal amplitudes in the time slots, respectively, included in one frame are different from one another as shown in wave form chart A of FIG. 6. When the input signal shown in FIG. 6(a) is received by the wireless repeater 3 from the mobile stations, the envelope detector 11 outputs an envelope having a wave form shown in wave form chart B of FIG. 6.

As will be understood from the wave form shown in wave form chart B of FIG. 6, the same wave form patterns are repeatedly produced in a cycle of 20 ms. It therefore follows that the low frequency components outputted from the envelope detector 11 include 50 Hz (=1/20 ms). The fact that the low frequency components outputted from the envelope detector 11 includes 50 Hz is invariable even if a signal level based on the radio wave transmitted from any mobile station is increased and accordingly restricted to the predetermined upper-limiting level. Therefore, the low frequency components outputted from the envelope detector 11 includes an alternating current component of 50 Hz when the level of the output signal (hereinlater referred to as "output signal level") does not reaches and accordingly is not restricted to the upper-limiting level, or when the increase of the output signal level to the extent of the upper-limiting level is due to only the increase of the input signal level. The center frequency of the predetermined frequency band allowed by the band-pass filter 14 is set to 50 Hz with the intention of deriving the alternating current component corresponding to the reciprocal number of the duration of the frame or 50 Hz.

If, on the other hand, the wireless repeater 3 produces the oscillation resulting from the coupling of the mobile station side antenna 3a and the base station side antenna 3b, the output signal is held at a constant level. As a result, the output of the envelope detector 11 is held at a constant level as shown in FIG. 6(c). This means that the low frequency components of the output signal include no alternating current component when the wireless repeater 3 is oscillating.

As will be apparent from the explanation described hereinbefore, when the output signal level reaches and accordingly is restricted to the predetermined upper-limiting level, a determination can be made upon whether the restrictive increase of the output signal level results from the oscillation of the wireless repeater 3 or from the approach of the mobile station to the wireless repeater 3, by judging whether the low frequency components of the envelope of the output signal include the alternating current component corresponding to the reciprocal number of the duration of one frame or not. In the monitoring circuit 17, a judgment is made upon whether the alternating current level is smaller than the predetermined criterion level or not. Based on the judgment on the alternating current output level as well as the judgment on the direct current output level, the monitoring circuit 17 decides whether the wireless repeater 3 is oscillating or not. FIG. 7 is a descriptive diagram showing decision results made by the monitoring circuit 17 in each combination of the two judgments upon the direct current output level and upon the alternating current output level.

According to the wireless repeater according to the present invention, the oscillation detecting apparatus 1 installed into the wireless repeater 3 decides that the wireless repeater 3 is oscillating when the direct current output level has reaches the predetermined upper-limiting level and when the alternating current level is smaller than the predetermined criterion level. The wireless repeater 3, therefore, can automatically detect its own oscillation with accuracy. Since the alternating component level corresponds to the reciprocal number of the duration of one frame in TDMA system, the accuracy of the decision upon the oscillation of the wireless repeater 3 can be enhanced all the more. In the wireless repeater 3, the driving circuit 37 receives the output of the low-pass filter 12 as a criterion data for the AGC, i.e., the envelope detector 11 and the low-pass filter 12 are held in common by the oscillation detecting apparatus 1 and the AGC circuit, so that the wireless repeater 3 having not only the AGC circuit but also the oscillation detecting apparatus 1 can be small-sized and simplified. Although the oscillation detecting apparatus 1 is applied to the up-communication repeater unit 30a, the oscillation detecting apparatus may be applied to the down-communication repeater unit 30b. Providing that the oscillation detecting apparatus is applied to the down-communication repeater unit 30b, the oscillation detecting apparatus has no need to include the band-pass filter 14, the alternating current level detector 15 and part of the monitoring circuit 17 participating in the judgment upon the alternating current output level for the following reason. Hence the base station 2 is fixed, the level of the input signal of the down-communication repeater unit 30b is scarcely increased. Therefore, the level of the output signal of the down-communication repeater unit 30b is not extremely increased depending upon causes except the oscillation of the wireless repeater 3. The oscillation detecting apparatus applied to the down-communication repeater unit 30b can decide whether the wireless repeater 3 is oscillating or not, on the basis of only the judgment upon the direct current output level. In addition it will be apparent from the aforementioned reason that the oscillation detecting apparatus 1 shown in FIG. 4 is effective in the up-communication rather than the down-communication.

Figure 8:
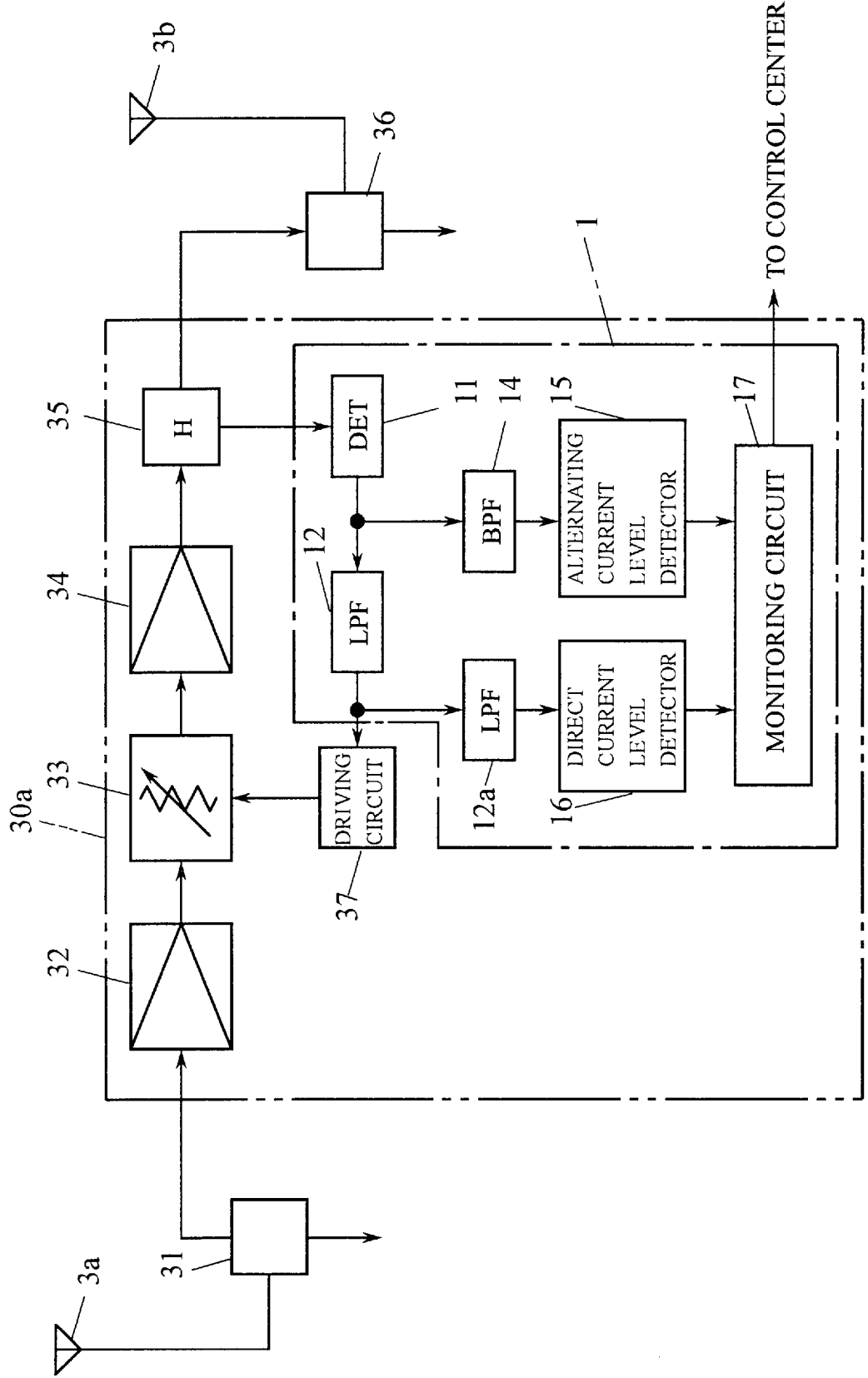
FIG. 8 is a schematic block diagram showing an up-communication repeater unit of a second embodiment of the wireless repeater according to the present invention.

Referring to FIG. 8 of the drawings, a second embodiment of the wireless repeater according to the present invention will be described hereinafter. The second embodiment of the wireless repeater includes the same constitutional elements as the first embodiment of the wireless repeater does. The constitutional elements of the second embodiment are respectively designated by the same reference numerals and symbols as the individual constitutional elements of the first embodiment are done, with the intention of omitting repeated description thereof.

The oscillation detecting apparatus 1 is shown in FIG. 8 as comprising an additional low-pass filter 12a interposed between the low-pass filter 12 and the direct current level detector 16. Although the low-pass filter 12 in the first embodiment shown in FIG. 4 has the driving circuit 37 as well as the direct current level detector 16 under its own influence, the low-pass filter 12a in the second embodiment has only the direct current level detector 16 under its own influence. The low-pass filter 12a, therefore, can be designed for the exclusive use of the direct current level detector 16. The low-pass filter 12 can be also designed for the exclusive use of the driving circuit 37. This means that a cut-off frequency of the low-pass filter 12a can be determined independently of that of the low-pass filter 12 and, for this reason, the low-pass filters 12 and 12a can adopt the most suitable frequencies, respectively. In general, the AGC circuit is required to control the cut-off frequency of the low-pass filter 12 in accordance with the intensity of fading and the like. The low-pass filter 12 is provide with a resistor and a capacitor as shown in FIGS. 5(a) and 5(b). The control of the cut-off frequency of the low-pass filter 12 can be made by regulating a time constant defined by the resistor and the capacitor.

Although the first embodiment shown in FIG. 4 is advantageous over the second embodiment shown in FIG. 8 in reducing the number of circuit elements and cost of the circuit, the second embodiment is advantageous over the first embodiment in enhancing the performance of the AGC circuit and the accuracy of the direct current output level. The oscillation detecting apparatus 1 shown in FIG. 8 is preferably applied to a wireless repeater which is frequently approached by the mobile stations or which is frequently utilized by the mobile stations.

Figure 9:
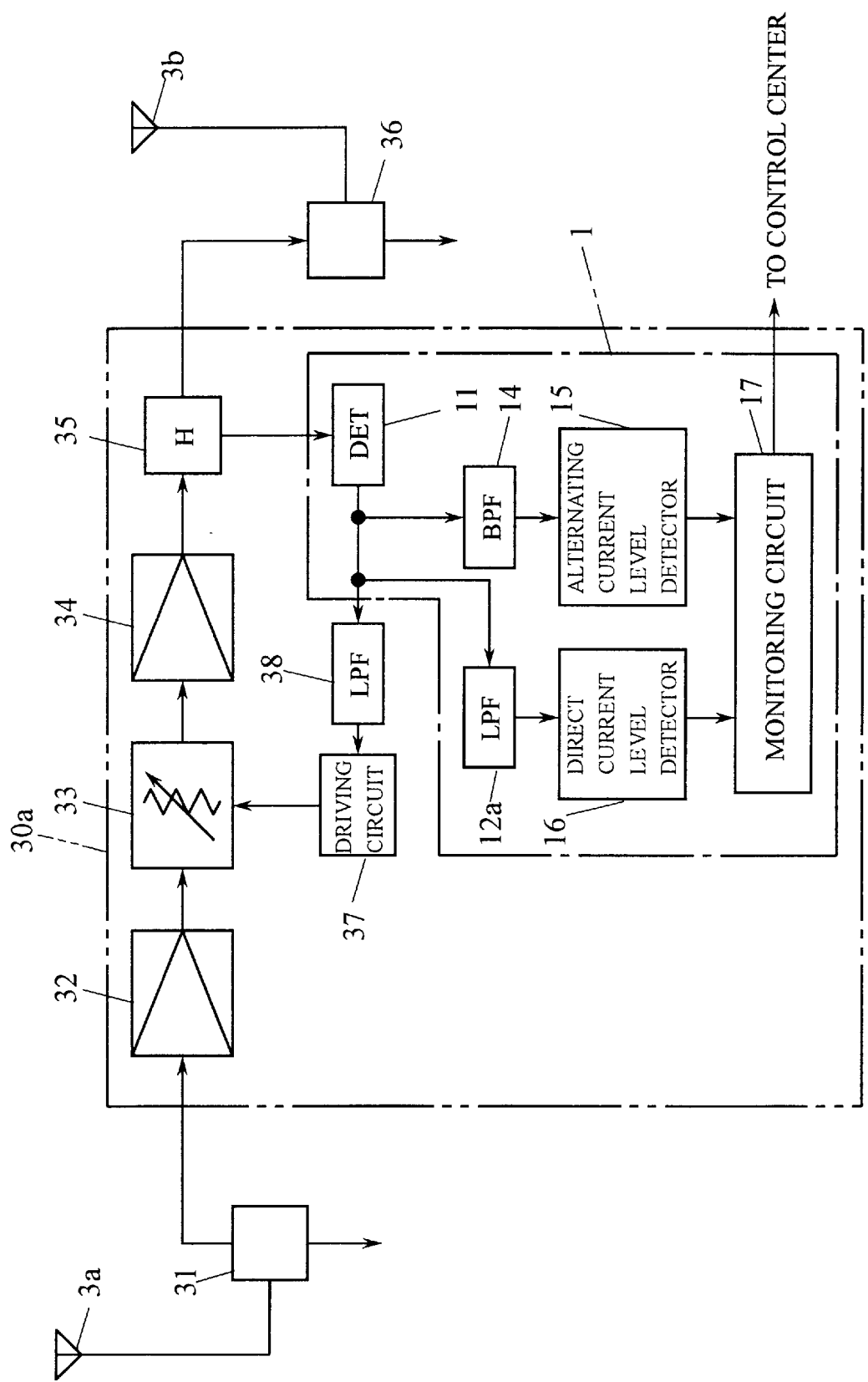
FIG. 9 is a schematic block diagram showing an up-communication repeater unit of a third embodiment of the wireless repeater according to the present invention.

Referring to FIG. 9 of the drawings, a third embodiment of the wireless repeater according to the present invention will be described hereinafter. The third embodiment of the wireless repeater includes the same constitutional elements as the second embodiment of the wireless repeater does. The constitutional elements of the third embodiment are respectively designated by the same reference numerals and symbols as the individual constitutional elements of the second embodiment are done, with the intention of omitting repeated description thereof.

The oscillation detecting apparatus 1 shown in FIG. 9 is similar to that shown in FIG. 8 except for the connection of the input line of the low-pass filter 12a.

The input line of the low-pass filter 12a shown in FIG. 8 is connected to the envelope detector 11 by way of the low-pass filter 12, while the input line of the low-pass filter 12a shown in FIG. 9 is directly connected to the envelope detector 11. As will be apparent from the construction of the oscillation detecting apparatus shown in FIG. 9, the third embodiment of the wireless repeater have the same advantages as the second embodiment does.

Figure 10:
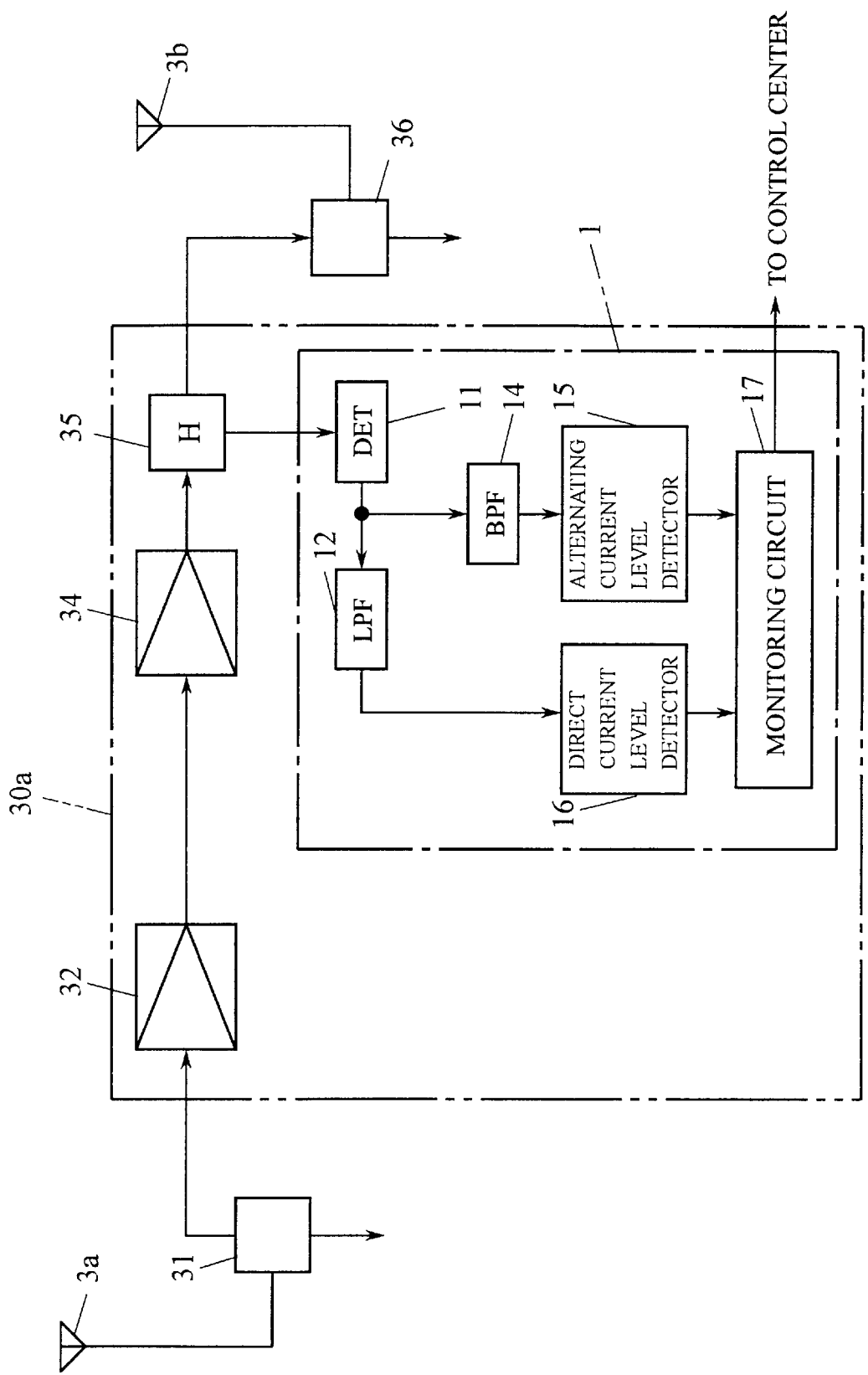
FIG. 10 is a schematic block diagram showing an up-communication repeater unit of a fourth embodiment of the wireless repeater according to the present invention.
Figure 11:
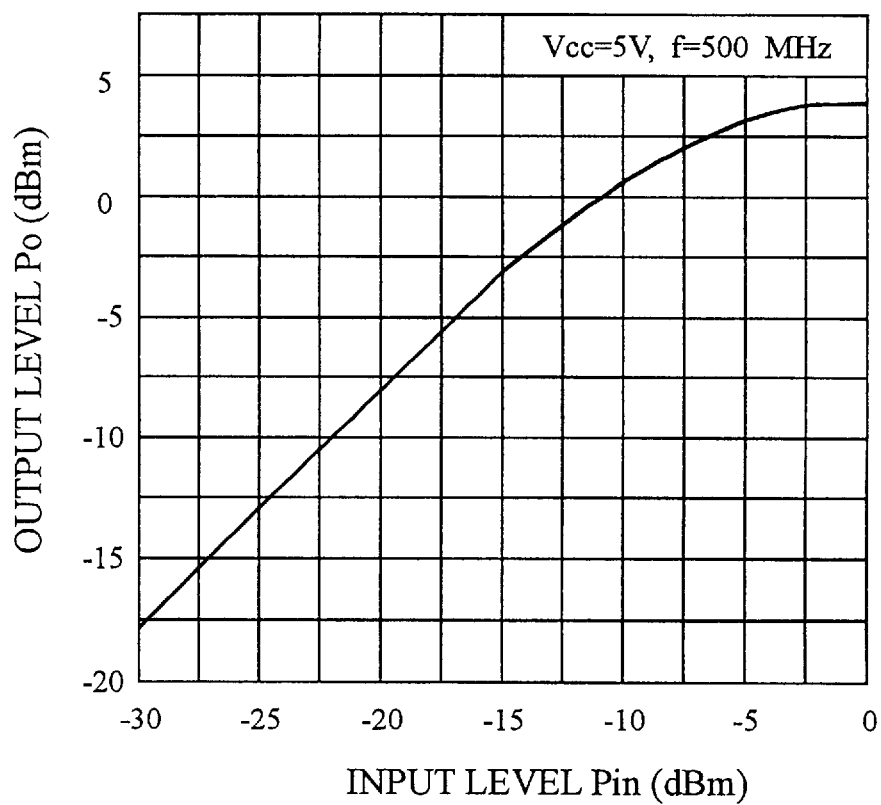
FIG. 11 is a graph showing an input-output characteristic of a main amplifier shown in FIG. 10.

Referring to FIGS. 10 and 11 of the drawings, a fourth embodiment of the wireless repeater according to the present invention will be described hereinlater. The forth embodiment of the wireless repeater includes the same constitutional elements as the first embodiment of the wireless repeater does. The constitutional elements of the fourth embodiment are respectively designated by the same reference numerals and symbols as the individual constitutional elements of the first embodiment are done, with the intention of omitting repeated description thereof.

Although the first to third embodiments of the wireless repeater shown in FIGS. 4, 8 and 9 are adapted to carry out the AGC, the fourth embodiment of the wireless repeater shown in FIG. 10 is not done so. Specifically, the fourth embodiment of the wireless repeater shown in FIG. 10 does not include the variable attenuator 33 and driving circuit 37 shown in FIG. 4 and, as a consequence, has no AGC circuit.

As shown in FIG. 11, the main amplifier 34 has an input-output characteristic in which its own output level Po is saturated as its own input level Pin is increased. When the input level Pin is in a high level range, the variation of the output level is small in comparison with that of the input level. The input-output characteristic shown in FIG. 11 belongs to an amplifier of model No. "$\mu$PC1675G" manufacture by NEC CORPORATION and is defined under the condition that a supply voltage Vcc and a frequency are 5 V and 500 MHz, respectively.

Although the amplifier of model No. "$\mu$PC1675G" is adopted by way of example as the main amplifier 34, other amplifier having an input-output characteristic similar to that of the amplifier of model No. "$\mu$PC1675G" may be adopted as the main amplifier 34 in accordance with required frequency and output level and so on. In anyway, the amplifier adopted as the main amplifier 34 is required to have an input-output characteristic in which its own output level has a tendency to be saturated as its own input level is increased.

The increase of the level of the input signal due to the approach of the mobile station 4a to the wireless repeater 3 results in the fact that all the input levels in the time slots of one frame in TDMA system do not become large. It is only natural that there are small input levels in one frame. The output signal comprises alternating current components even if the level variation of the input signal is small. Therefore, the wireless repeater can be able to detect its own oscillation without the AGC circuit.

Referring to FIGS. 12 and 13 of the drawings, a fifth embodiment of the wireless repeater according to the present invention will be described hereinafter. The fifth embodiment of the wireless repeater includes the same constitutional elements as the forth embodiment of the wireless repeater does. The constitutional elements of the fifth embodiment are respectively designated by the same reference numerals and symbols as the individual constitutional elements of the fourth embodiment are done, with the intention of omitting repeated description thereof.

Although the first to fourth embodiments of the wireless repeater fail to specify the timing or order of the two judgments upon whether the direct current level reaches the upper-limiting level or not, and whether the alternating current level is smaller than the criterion level or not, the fifth embodiment specifies the timing or order of the two judgments.

Referring to FIG. 1, if the first mobile station 4a in the vicinity of the wireless repeater 3 starts to communicate with the second mobile station 4b under the condition that there is no communication through the wireless repeater 3 right now, both of the direct current output level and the alternating current output level are increased. If, in this situation, the judgment on the direct current output level is made in advance of the judgment on the alternating current output level, it is possible that the oscillation detecting apparatus 1 provisionally decides that the wireless repeater 3 is oscillating. To the contrary, it is assumed that the first mobile station 4a in the vicinity of the wireless repeater 3 stops to communicate with the second mobile station 4b. Under this assumption, if the judgment on the alternating current output level is made in advance of the judgment on the direct current output level, it is possible that the oscillation detecting apparatus 1 provisionally decides that the wireless repeater 3 is oscillating.

Figure 13A:
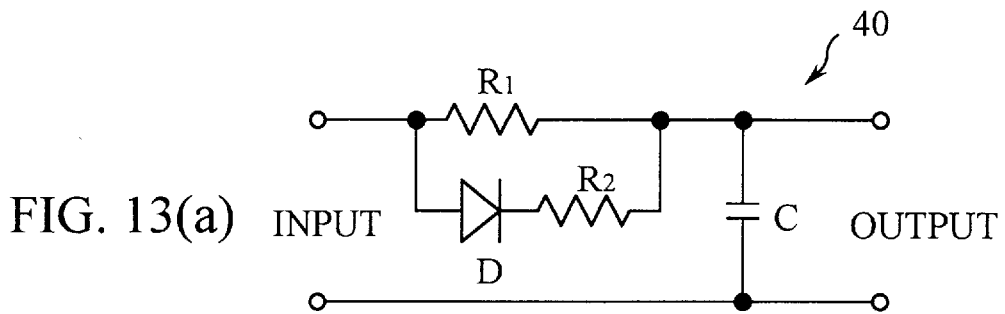
FIG. 13(a) is a wiring diagram showing a time constant circuit shown in FIG. 12 as being electrically connected to the alternating current level detector.
Figure 13B:
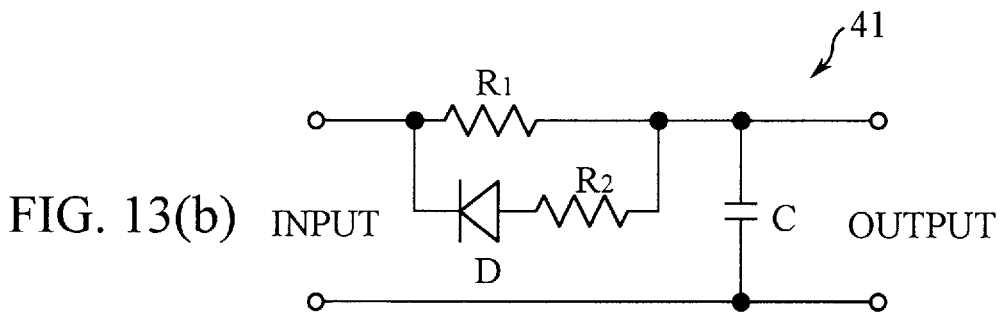
FIG. 13(b) is a wiring diagram showing another time constant circuit shown in FIG. 12 as being electrically connected to the direct current level detector.

In order to correctly eliminate the provisional detection of the oscillation, the fifth embodiment of the wireless repeater 3 specifies the priority order of the judgments on the direct current output level and on the alternating current output level. Concretely, the oscillation detecting apparatus 1 comprises a time constant circuit 41 interposed between the direct current level detector 16 and the monitoring circuit 17 and a time constant circuit 40 interposed between the alternating current level detector 15 and the monitoring circuit 17. The time constant circuits 40 and 41 are shown in FIGS. 13(a) and 13(b), respectively, as each comprising resistors $R_1$ and $R_2$, a capacitor C and a diode D. The diode D of the time constant circuit 40 shown in FIG. 13(a) differs in direction of rectification from that of the time constant circuit 41 shown in FIG. 13(b). The time constant circuit 40 is adapted to decrease its own time constant when the alternating current output level lower than the predetermined criterion level becomes higher than the predetermined criterion level. The time constant circuit 40 is further adapted to increase its own time constant when the alternating current output level higher than the predetermined criterion level becomes lower than the predetermined criterion level. The time constant circuit 41, on the other hand, is adapted to increase its own time constant when the direct current output level lower than the predetermined upper-limiting level becomes higher than the predetermined upper-limiting level. The time constant circuit 41 is further adapted to decrease its own time constant when the direct current output level higher than the predetermined upper-limiting level becomes lower than the predetermined upper-limiting level. The time constant circuits 40 and 41 have different time constant, respectively. The difference between the time constants of the time constant circuits 40 and 41 invites a time-lag between the judgments on the alternating current output level and on the direct current output level.

More specifically, in the time constant circuit 40 the diode D is forward-biased when the input signal is changed from a low level sate to a high level state, i.e., when, under the condition that there is no mobile communication through the wireless repeater 3 right now, the mobile communication between the first and second mobile stations 4a and 4b through the wireless repeater 3 is started. It therefore follows that an electric current used for charging up the capacitor C flows through both of the resistors $R_1$ and $R_2$. In this instance, the time constant is denoted by "τ" and then designated by an equation described below:

$$\tau = \{(R_1 \times R_2)/(R_1+R_2)\} \times C \tag{3}$$

When, on the contrary, the input signal is changed from the high level state to the low level state, i.e., when the mobile communication between the first and second mobile stations 4a and 4b through the wireless repeater 3 is terminated, the diode D of the time constant circuit 40 is reverse-biased. It therefore follows that the electric current discharged from the capacitor C flows only through the resistor $R_1$. In this instance, the time constant τ is designated by an equation described below:

$$\tau = R_1 \times C \tag{4}$$

In view of the fact that $R_2/(R_1+R_2)<1$, the time constant τ defined by the equation (3) is shorter than that by the equation (4).

In the time constant circuit 41 the diode D is reverse-biased when the input signal is changed from a low level sate to a high level state, i.e., when, under the condition that there is no mobile communication through the wireless repeater 3 right now, the mobile communication between the first and second mobile stations 4a and 4b through the wireless repeater 3 is started. It therefore follows that an electric current used for charging up the capacitor C flows only through the resistor $R_1$. In this instance, the time constant τ is designated by the latter equation (4). When, on the contrary, the input signal is changed from the high level state to the low level state, i.e., when the mobile communication between the first and second mobile stations 4a and 4b through the wireless repeater 3 is terminated, the diode D of the time constant circuit 41 is forward-biased. It therefore follows that the electric current discharged from the capacitor C flows through both of the resistors $R_1$ and $R_2$. In this instance, the time constant τ is designated by the former equation (3).

As will be appreciated from the explanation described hereinbefore, when, under the condition that there is no mobile communication right now, the mobile communication between the mobile stations 4a and 4b through the wireless repeater 3 is started, the time constant τ of the time constant circuit 40 becomes shorter than that of the time constant circuit 41. The time constant circuit 41 and the direct current level detector 16 as a whole are considered to be a first combined circuit having a time constant, while the time constant circuit 40 and the alternating current level detector 15 as a whole are considered to be a second combined circuit having a time constant. The first and second combined circuits are designed to have the same relation in time constant as the time constant circuits 41 and 40. Specifically, the time constant of the second combined circuit becomes shorter than that of the first combined circuit when, under the condition that there is no mobile communication through the wireless repeater 3 right now, the mobile communication between the first and second mobile stations 4a and 4b through the wireless repeater 3 is started. This results in the fact that the judgment on the alternating current output level is made by the monitoring circuit 17 in advance of the judgment on the direct current output level.

The foregoing provisional oscillation of the wireless repeater 3, therefore, can be exactly prevented from being detected by the monitoring circuit 17.

In the meantime, the time constant of the second combined circuit becomes longer than that of the first combined circuit when the mobile communication between the first and second mobile stations 4a and 4b through the wireless repeater 3 is terminated. This means that the judgment on the direct current output level is made by the monitoring circuit 17 in advance of the judgment on the alternating current output level. The foregoing provisional oscillation of the wireless repeater 3, therefore, can be exactly prevented from being detected by the monitoring circuit 17. Although the monitoring circuit 17 is assumed, by way of example, as being an electrical circuit, the monitoring circuit 17 may be embodied by a central processing unit (generally referred to as "CPU" for brevity) and programs executed by the CPU. If the monitoring circuit 17 is thus constructed, the oscillation detecting apparatus 1 has no need to include the time constant circuits 40 and 41 and accordingly makes it possible to cause its own circuit size and construction to be small and simple, respectively. The reason why the oscillation detecting apparatus 1 has no need to include the time constant circuits 40 and 41 is that the order of the judgments on the direct current output level and on the alternating current output level can be determined by the programs.

Figure 14:
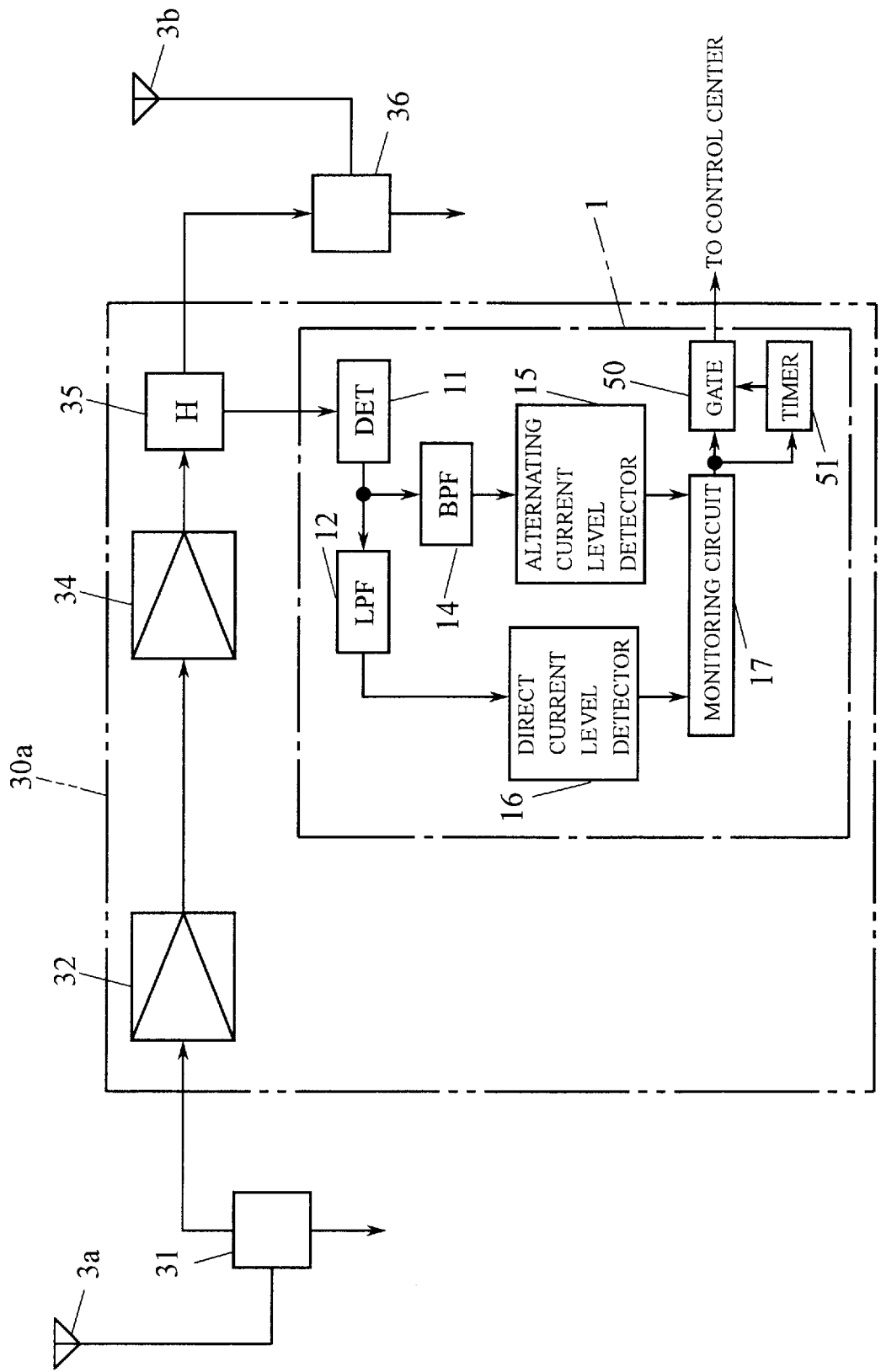
FIG. 14 is a schematic block diagram showing an up-communication repeater unit of a sixth embodiment of the wireless repeater according to the present invention.

Referring to FIG. 14 of the drawings, a sixth embodiment of the wireless repeater according to the present invention will be described hereinafter. The sixth embodiment of the wireless repeater includes the same constitutional elements as the fifth embodiment of the wireless repeater does. The constitutional elements of the sixth embodiment are respectively designated by the same reference numerals and symbols as the individual constitutional elements of the fifth embodiment are done, with the intention of omitting repeated description thereof.

In the fifth embodiment of the wireless repeater described hereinbefore, a difference between the time constants based on the time constant circuits 40 and 41 effects the time-lag of judgments upon the direct current output level and upon the alternating current output level, thereby preventing the provisional oscillation of the wireless repeater 3 from being detected by the monitoring circuit 17. In the sixth embodiment of the wireless repeater herein described, the oscillation detecting apparatus 1 waits to send the monitoring result by the monitoring circuit 17 to the control center for a short time, thereby preventing the provisional oscillation of the wireless repeater 3 from being sent to the control center. In the sixth embodiment, the communication administrators can be prevented from regarding the provisional oscillation as a proper oscillation of the wireless repeater 3 The sixth embodiment of the oscillation detecting apparatus 1 is shown in FIG. 14 as comprising a gate 50 for preventing data from passing therethrough in the off state and for allowing the data to pass therethrough in the on state, and a timer 51 for measuring an elapsed time. The gate 50 is usually held in the off state and accordingly waits to send the monitoring result from the monitoring circuit 17 to the control center. The monitoring circuit 17 is operated to send a timer start signal to the timer 51 simultaneously when either the judgment upon the direct current output level or the judgment upon the alternating current output level is made by the monitoring circuit 17. The timer 51 is operated to start to measure an elapsed time in response to the timer start signal received from the monitoring circuit 17. When the measured elapsed time exceeds a predetermined time, the timer 51 sends the gate 50 a time-up signal indicating that the time is up. When the gate 50 receives the time-up signal from the timer 51, the gate 50 is changed from the off state to the on state to allow the monitoring result by the monitoring circuit 17 to pass therethrough. The monitoring circuit 17 is further operated to reset the timer 51 when both of the judgments upon the direct current output level and upon the alternating current output level are finished. The predetermined time may be set to a period shorter than the difference between the time constants respectively defined by the time constant circuits 40 and 41 in the fifth embodiment shown in FIG. 12.

Although one of the judgments upon the direct current output level and upon the alternating current output level may be made in advance of the other, in either case the oscillation detecting apparatus 1 shown in FIG. 14 does not send the monitoring result to the control center until the elapsed time measured by the timer 51 exceeds the predetermined time. In the sixth embodiment of the wireless repeater thus constructed, the administrators posted to the communication administration facilities is prevented from regarding the provisional oscillation as the proper oscillation of the wireless repeater 3 and, as a result, can conclusively decide whether the wireless repeater 3 is oscillating or not, with accuracy.

Similarly to the fifth embodiment of the wireless repeater 3, the monitoring circuit 17 may be embodied by a CPU and programs executed by the CPU. If the monitoring circuit 17 is thus constructed, the oscillation detecting apparatus 1 has no need to include the gate 50 and the timer 51 and accordingly makes it possible to cause its own circuit size and construction to be small and simple, respectively. The reason why the oscillation detecting apparatus 1 has no need to include the gate 50 and the timer 51 is that the measure of the elapsed time, the comparison of the elapsed time with the predetermined time and the timing of the transmission of the monitoring result made by the monitoring circuit 17 can be completed by executing the program.

The many features and advantages of the invention are apparent from the detailed specification and thus it is intended by the appended claims to cover all such features and advantages of the invention which fall within the true spirit and scope thereof. Further, since numerous modifications and changes will readily occur to those skilled in the art, it is not desired to limit the invention to the exact construction and operation illustrated and described, and accordingly, all suitable modifications and equivalents may be resorted to, falling with the scope of the invention.

What is claimed is:

1. An oscillation detecting apparatus for detecting an oscillation of a wireless repeater intervening between a base station and a mobile station brought in communication with each other through a time division multiple access system, said wireless repeater being operated to produce an input signal based on a radio wave transmitted from one of said base station and said mobile station, and amplify said input signal to produce an output signal, said wireless repeater being further operated to transmit said output signal in the form of a radio wave to the other of said base station and said mobile station, and said oscillation detecting apparatus comprising:

producing means for producing a power level signal varied in proportion with an amplitude of said output signal;

first detecting means for detecting a direct current component included in said power level signal;

second detecting means for detecting an alternating current component included in said power level signal;

first judging means for judging whether said direct current component of said power level signal has reached a predetermined upper-limiting level or not;

second judging means for judging whether said alternating current component of said power level signal is smaller than a predetermined criterion level or not; and deciding means for deciding that said wireless repeater is oscillating when said first judging means judges that said direct current component of said power level signal has reached said predetermined upper-limiting level, and when said second judging means judges that said alternating current component of said power level signal is smaller than said predetermined criterion level.

2. An oscillation detecting apparatus as set forth in claim 1, in which said producing means comprises a detection circuit for detecting an envelope of said power level signal, said first detecting means comprising a filter circuit for allowing only low frequency components including said direct current component of said power level signal to be supplied from said detection circuit to said first judging means, and said second detecting means comprising a filter circuit for allowing only a frequency band including said alternating current component of said power level signal to be supplied from said detection circuit to said second judging means.

3. An oscillation detecting apparatus as set forth in claim 1, in which said time division multiple access system divides a radio spectrum into a plurality of time slots respectively occupied by users, said time slots collectively forming a frame and each reoccurring every frame, and said alternating current component having a frequency corresponding to a reciprocal number of duration of said frame.

4. An oscillation detecting apparatus as set forth in claim 1, further comprising:

first delay means for delaying the judgment made by said first judging means for a first predetermined period; and second delay means for delaying the judgment made by said second judging means for a second predetermined period longer than said first predetermined period.

5. An oscillation detecting apparatus as set forth in claim 1, further comprising:

first delay means for delaying the judgment made by said first judging means for a first predetermined period: and second delay means for delaying the judgment made by said second judging means for a second predetermined period shorter than said first predetermined period.

6. An oscillation detecting apparatus as set forth in claim 1, further comprising:

third judging means for judging whether an elapsed time after at least one of the judgments by said first and second judging means exceeds a predetermined period; and outputting means for outputting the decision made by said deciding means when said third judging means judges that the elapsed time after at least one of the judgments by said first and second judging means exceeds said predetermined period.

7. An oscillation detecting apparatus as set forth in claim 6, in which said outputting means is operated to transmit the decision made by said deciding means to communication facilities positioned apart from said oscillating detecting apparatus.

8. An oscillation detecting apparatus as set forth in claim 1, in which said producing means, first and second detecting means, said first and second judging means and said deciding means serve only an up-communication in which said wireless repeater relays the radio wave transmitted from said mobile station to said base station.

9. A wireless repeater intervening between a base station and a mobile station brought in communication with each other through a time division multiple access system, comprising:

receiving means for receiving a radio wave transmitted from one of said base station and said mobile station and producing an input signal based on the received radio wave;

amplifying means for amplifying said input signal to produce an output signal;

transmitting means for reproducing a radio wave on the basis of said output signal and transmitting the reproduced radio wave to the other of said base station and said mobile station;

producing means for producing a power level signal varied in proportion with an amplitude of said output signal;

first detecting means for detecting a direct current component included in said power level signal;

second detecting means for detecting an alternating current component included in said power level signal;

first judging means for judging whether said direct current component of said power level signal has reached a predetermined upper-limiting level or not;

second judging means for judging whether said alternating current component of said power level signal is smaller than a predetermined criterion level or not; and deciding means for deciding that said wireless repeater is oscillating when said first judging means judges that said direct current component of said power level signal has reached said predetermined upper-limiting level, and when said second judging means judges that said alternating current component of said power level signal is smaller than said predetermined criterion level.

10. A wireless repeater as set forth in claim 9, in which said producing means comprises a detection circuit for detecting an envelope of said power level signal, said first detecting means comprising a filter circuit for allowing only low frequency components including said direct current component of said power level signal to be supplied from said detection circuit to said first judging means, and said second detecting means comprising a filter circuit for allowing only a frequency band including said alternating current component of said power level signal to be supplied from said detection circuit to said second judging means.

11. A wireless repeater as set forth in claim 10, further comprising an output signal regulation unit for regulating said output signal on the basis of the low frequency components supplied from said filter circuit of said first detecting means, and said detection circuit, said filter circuit of said first detecting means and said output signal regulation unit as a whole forming an automatic gain control circuit for controlling a gain indicative of a ratio of said input signal to said output signal to restrict said output signal to said predetermined upper-limiting level.

12. A wireless repeater as set forth in claim 10, further comprising an output signal regulation unit for regulating said output signal on the basis of the envelope of said output signal from said detection circuit and a filter unit interposed between said detection circuit and said output signal regulation unit for allowing only low frequency components included in said power level signal to be supplied from said detection circuit to said output signal regulation unit, and said detection circuit, said filter unit and said output signal regulation unit as a whole forming an automatic gain control circuit for controlling a gain indicative of a ratio of said input signal to said output signal to restrict said output signal to said predetermined upper-limiting level.

13. A wireless repeater as set forth in claim 9, in which said producing means, said first and second detecting means, said first and second judging means and said deciding means serve only an up-communication in which said wireless repeater relays the radio wave transmitted from said mobile station to said base station.

14. A wireless repeater as set forth in claim 9, in which said time division multiple access system divides a radio spectrum into a plurality of time slots respectively occupied by users, said time slots collectively forming a frame and each reoccurring every frame, and said alternating current component having a frequency corresponding to a reciprocal number of duration of said frame.

15. A wireless repeater as set forth in claims 9, further comprising:

first delay means for delaying the judgment made by said first judging means for a first predetermined period; and second delay means for delaying the judgment made by said second judging means for a second predetermined period longer than said first predetermined period.

16. A wireless repeater as set forth in claim 9, further comprising:

first delay means for delaying the judgment made by said first judging means for a first predetermined period: and second delay means for delaying the judgment made by said second judging means for a second predetermined period shorter than said first predetermined period.

17. A wireless repeater as set forth in claim 9, further comprising:

third judging means for judging whether an elapsed time after at least one of the judgments by said first and second judging means exceeds a predetermined period; and outputting means for outputting the decision made by said deciding means when said third judging means judges that the elapsed time after at least one of the judgments by said first and second judging means exceeds said predetermined period.

18. A wireless repeater as set forth in claim 17, in which said outputting means is operated to transmit the decision made by said deciding means to communication facilities positioned apart from said wireless repeater.

* * * * *